US009542468B2

(12) United States Patent
Itoh

(10) Patent No.: US 9,542,468 B2
(45) Date of Patent: Jan. 10, 2017

(54) DATABASE MANAGEMENT SYSTEM AND METHOD FOR CONTROLLING SYNCHRONIZATION BETWEEN DATABASES

(71) Applicant: Hitachi, Ltd., Tokyo (JP)

(72) Inventor: Akihiro Itoh, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 14/425,427

(22) PCT Filed: Mar. 24, 2014

(86) PCT No.: PCT/JP2014/058051
§ 371 (c)(1),
(2) Date: Mar. 3, 2015

(87) PCT Pub. No.: WO2015/145536
PCT Pub. Date: Oct. 1, 2015

(65) Prior Publication Data
US 2016/0259837 A1    Sep. 8, 2016

(51) Int. Cl.
*G06F 17/30* (2006.01)
(52) U.S. Cl.
CPC ... *G06F 17/30581* (2013.01); *G06F 17/30339* (2013.01); *G06F 17/30368* (2013.01)
(58) Field of Classification Search
CPC ............ G06F 17/30581; G06F 17/30368; G06F 17/30339
See application file for complete search history.

(56) References Cited

U.S. PATENT DOCUMENTS 6,192,365 B1 *   2/2001   Draper .................... G06F 9/466
                                                              707/648
2002/0049776 A1 *  4/2002  Aronoff ............ G06F 17/30174
(Continued)

FOREIGN PATENT DOCUMENTS

JP           06-266599            9/1994
JP           2001-022627 A        1/2001
(Continued)

OTHER PUBLICATIONS

International Search Report and the Written Opinion of the International Searching Authority on application PCT/JP2014/058051 mailed Jun. 24, 2014; 8 pages.
(Continued)

*Primary Examiner* — Albert Phillips, III
(74) *Attorney, Agent, or Firm* — Foley & Lardner LLP

(57) ABSTRACT

Data synchronization requires much time if synchronization is started from an initial state where synchronization between databases is not performed, and when a synchronized record is updated during the synchronization process, synchronization of records must be performed again, so that the amount of communication for synchronization is increased. Therefore, when starting synchronization, data synchronization is performed based on a method using a table indicating the synchronization statuses between databases, and at the final stage of synchronization, data synchronization is performed based on a query transmission method using update logs. The remaining synchronization time is periodically calculated of a case where synchronization is continued via the table method and a case where synchronization is performed by switching to the query transmission method, and the synchronization method is switched if the calculated remaining synchronization time
(Continued)

becomes shorter when switched to the query transmission method.

12 Claims, 12 Drawing Sheets

(56) References Cited

U.S. PATENT DOCUMENTS

| | | |
|---|---|---|
| 2006/0101083 A1 | 5/2006 | Cherkauer et al. |
| 2006/0218203 A1 | 9/2006 | Yamato et al. |
| 2007/0022263 A1* | 1/2007 | Fandel ................ G06F 11/2074 711/162 |
| 2010/0161925 A1 | 6/2010 | Kawaura |
| 2011/0040942 A1* | 2/2011 | Akirav .............. G06F 17/30575 711/159 |
| 2011/0066592 A1 | 3/2011 | Newport et al. |

FOREIGN PATENT DOCUMENTS

| | | |
|---|---|---|
| JP | 2006-268740 A | 10/2006 |
| JP | 2006-318020 A | 11/2006 |
| JP | 2010-146492 A | 7/2010 |
| JP | 2010-198204 A | 9/2010 |
| JP | 2011-060292 A | 3/2011 |
| JP | 2014-021691 A | 2/2014 |

OTHER PUBLICATIONS

PCT International Search Report on application PCT/JP2014/058051 mailed Jun. 24, 2014; 3 pages.

* cited by examiner

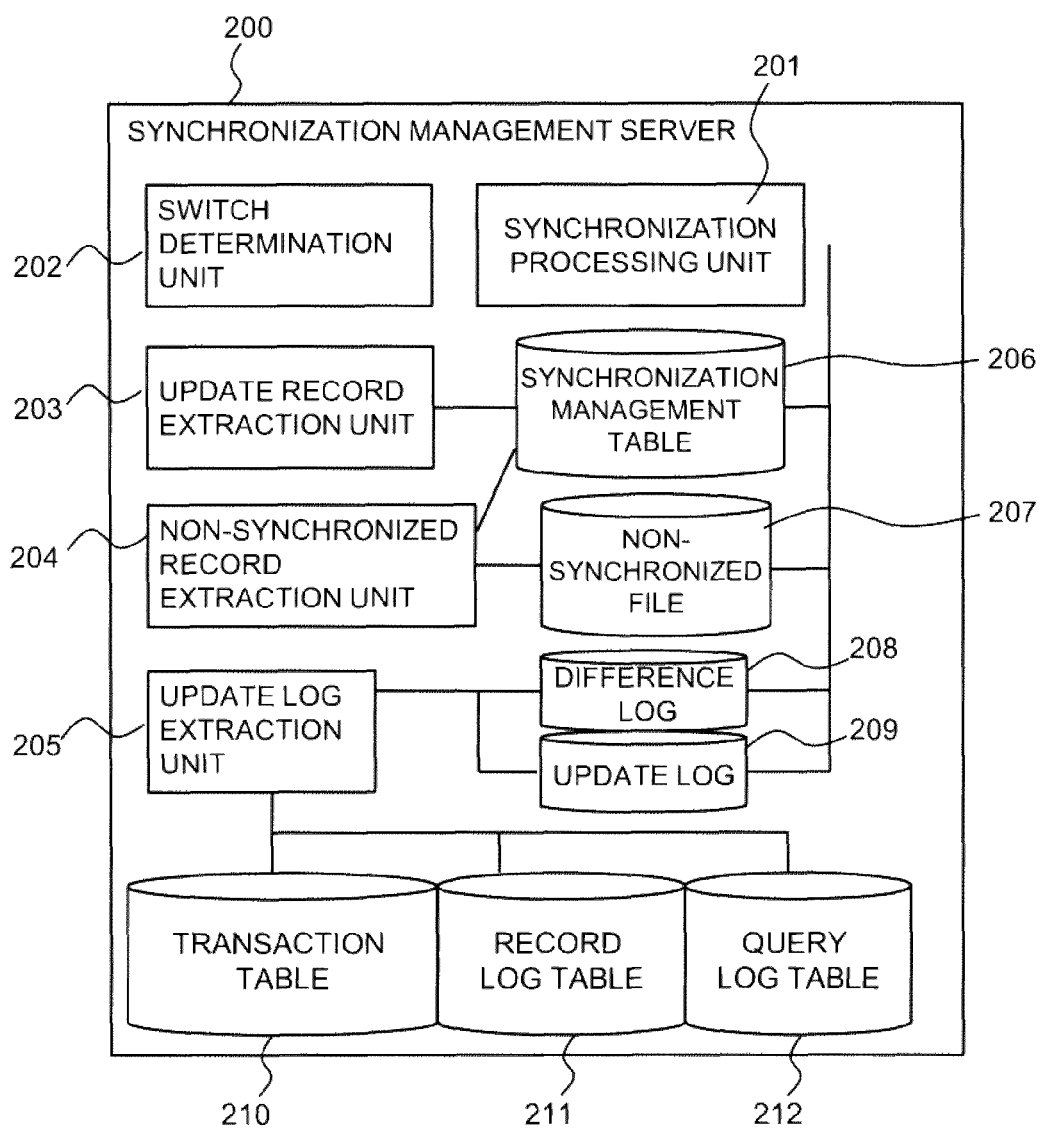

Fig. 4

SYNCHRONIZATION MANAGEMENT TABLE (206)

| KEY | DELETION FLAG | UPDATE FREQUENCY | SYNCHRONIZATION FLAG |
|-----|---------------|------------------|----------------------|
|     |               |                  |                      |

Fig. 5

QUERY LOG
Timestamp, SID, SQL
2014/1/1 12:00, 101, SET TRANSACTION ISOLATION LEVEL READ COMMITTED
2014/1/1 12:00, 101, CONNECT from 192.168.100.11
2014/1/1 12:00, 101, BEGIN TRANSACTION
2014/1/1 12:00, 101, INSERT INFO mytbl (uid,svr,dat1,dat2) VALUES(u100, svr1, grjg, ZD)
2014/1/1 12:00, 101, SELECT * from mytbl WHERE uid=u100
2014/1/1 12:01, 101, UPDATE mytbl SET dat2=ZD WHERE uid=u100 AND svr=svr2
2014/1/1 12:02, 101, DELETE FROM mytbl WHERE uid=u100 AND svr=svr3
2014/1/1 12:03, 101, COMMIT
2014/1/1 12:03, 101, DISCONNECT

Fig. 6

TRANSACTION LOG
Timestamp, TID, Operation, KEY, VALUE
2014/1/1 12:00, 1000, start
2014/1/1 12:00, 1000, insert, uid=u100:svr=svr1, dat1=grjg:dat2=ZD
2014/1/1 12:01, 1000, update, uid=u100:svr=svr2, dat2=ZD
2014/1/1 12:02, 1000, delete, uid=u100:svr=svr3
2014/1/1 12:03, 1000, end

Fig. 7

TRANSACTION TABLE (210)

| StartTime | TID | SID | EndFlag |
|---|---|---|---|
| | | | |

Fig. 8

RECORD LOG TABLE (211)

| Timestamp | TID | OP | KEY | VALUE | DIFFERENCE FLAG |
|---|---|---|---|---|---|
| | | | | | |

Fig. 9

QUERY LOG TABLE (212)

| Timestamp | SID | TLV | QUERY |
|---|---|---|---|
| | | | |

DATABASE MANAGEMENT SYSTEM AND METHOD FOR CONTROLLING SYNCHRONIZATION BETWEEN DATABASES

TECHNICAL FIELD

The present invention relates to controlling synchronization between databases.

BACKGROUND ART

In the prior art, as a disaster recovery system of databases, a configuration is adopted where data is synchronized between databases located at remote locations. There are various methods for realizing synchronization control between databases, and update logs are used in many cases. For example, according to Patent Literature 1, when database is updated, the content of update of the database is stored as a sentence stated using a database language in an update log, and periodically, the sentences stored in the update logs are re-executed in the database of the synchronization destination (migration destination) to realize synchronization of data.

Patent Literature 2 discloses an example of a synchronization method that does not use update logs. This control method assigns an update frequency per synchronization target data, and performs synchronization in order from the data having smaller update frequencies.

CITATION LIST

Patent Literature

[PTL 1] Japanese Patent Application Laid-Open Publication No. 2001-22627
[PTL 2] Japanese Patent Application Laid-Open Publication No. 2010-198204

SUMMARY OF INVENTION

Technical Problem

The synchronization of data between databases becomes necessary not only for disaster recovery but also for system migration. Especially when uninterrupted migration of the system is performed, it is necessary to start from an initial state where data synchronization is not performed at all, and to perform synchronization with the database of the synchronization destination (migration destination) without stopping the synchronization source (migration source) database.

As described, when the synchronization process is started from the initial state and until the process reaches a stable state where the databases are substantially synchronized, it is necessary to transmit all the synchronization target data, but since the communication bandwidth between remote locations is narrower than that within a data center, the bandwidth that can be used for synchronizing data is limited. Therefore, when synchronizing data between databases located at remote locations, the communication bandwidth between databases may become a bottleneck.

The system for transmitting update logs according to Patent Literature 1 is effective as a data synchronization method after having reached the stable state. However, if this system is adopted when performing synchronization from the initial state, update related to data whose update log has already been transmitted before synchronization is completed may occur, and as a result, the same data may be transmitted multiple times.

According to the control method taught in Patent Literature 2, synchronization is performed with priority from data having a smaller update frequency, so that the possibility of multiple transmissions occurring for the same data at the start of synchronization is small, but at the final stage of the synchronization process and after reaching the stable state, the amount of communication required for synchronization becomes greater than the method of Patent Literature 1. In the method taught in Patent Literature 1, by transmitting a sentence stated using a database language for data synchronization, update of multiple records is made possible by transmitting a single sentence, but in the method taught in Patent Literature 2, one record worth of data must always be transmitted to update a single record.

Solution to Problem

In consideration of the above-mentioned problems of the prior art, the present invention provides means for minimizing the amount of data transmission required for the synchronization process when starting synchronization of databases from an initial state where data synchronization is not performed at all.

Actually, when starting synchronization, data synchronization is performed via a method using a table showing the synchronization status between databases, and at the final stage of synchronization, data synchronization is performed via a query transmission method using update logs of the database. A remaining synchronization time is calculated periodically of the case where synchronization is continued via the table method and of the case where the method is switched to the query transmission method, and when the remaining synchronization time by switching to the query transmission method becomes shorter, the synchronization method is switched.

Advantageous Effects of Invention

According to the present invention, when starting synchronization between databases from an initial state where data synchronization is not performed at all, the amount of communication required to perform data synchronization between databases can be cut down.

BRIEF DESCRIPTION OF DRAWINGS

FIG. 3 is a software configuration diagram of a synchronization management server.
FIG. 4 is a vie illustrating a synchronization management table.
FIG. 5 is a view showing one example of a query log.
FIG. 6 is a view illustrating one example of is transaction log.
FIG. 7 is a view illustrating a transaction table.
FIG. 8 is a view illustrating a record log table.
FIG. 9 is a view illustrating a query log table.

DESCRIPTION OF EMBODIMENTS

Figure 1:
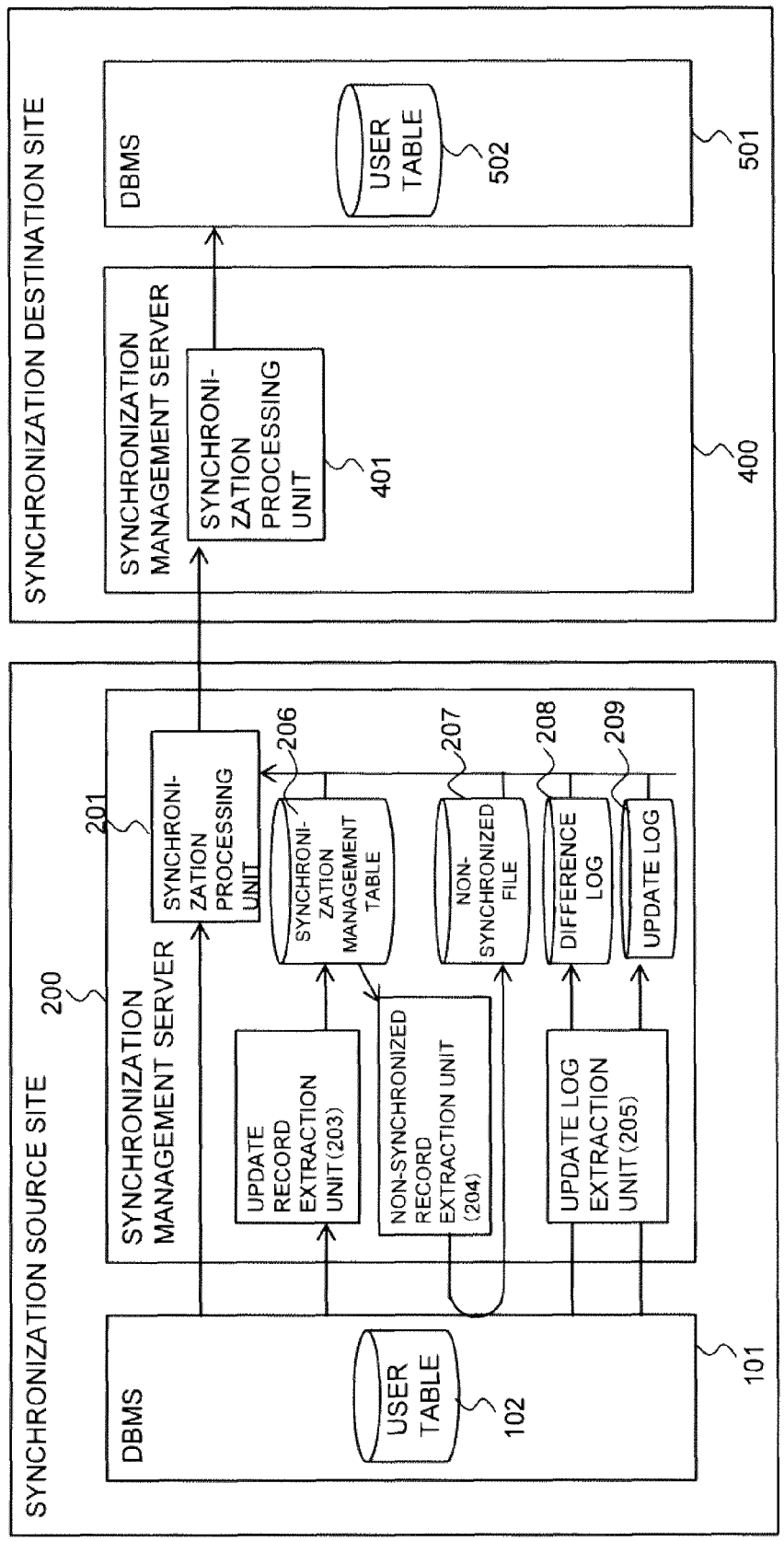
FIG. 1 is a configuration diagram illustrating an outline of a preferred embodiment of the present invention.

FIG. 1 is a configuration diagram illustrating the outline of a preferred embodiment of the present invention. An example is illustrated where data in a DBMS (DataBase Management System) 101 of a synchronization source (migration source) site is synchronized with a DBMS 501 of a synchronization destination (migration destination) site. In other words, a user table is respectively created for each of the DBMS 101 and DBMS 501, and the data in a user table 102 of the DBMS 101 is synchronized with the data in a user table 502 of the DBMS 501.

In FIG. 1, the number of the user table in each DBMS is one, but the present embodiment is also applicable to a configuration where multiple user tables exist in one DBMS. When starting the synchronization process, no data exists in the user table 502. The synchronization target data is mutually transmitted between sites via a synchronization management server 200 and a synchronization management server 400.

A synchronization management table 206 manages whether all records stored in the user table 102 have been synchronized or not (synchronization status). When the synchronization process is started, an update record extraction unit 203 extracts update of records from a transaction log output from the DBMS 101, and when a record is updated, the information of the relevant record in the synchronization management table 206 is set to "non-synchronized". A synchronization processing unit 201 refers to the synchronization management table 206 and extracts the "non-synchronized" records.

Further, only the section (KEY) capable of identifying the record is stored in the synchronization management table 206, and the other record-related data (VALUE) is stored in the user table 102. Then, the synchronization management table 206 accesses the DBMS 101, acquires the VALUE of the extracted record to create a complete record data, and then transmits the same to the DBMS 501 of the synchronization destination (migration destination) via a synchronization processing unit 401 in the synchronization management server 400. Further, the update frequency of each record is stored in the synchronization management table 206, and the synchronization processing unit 201 transmits the records in order from the record having the smallest update frequency. In the present specification, this synchronization method is called a table method.

When synchronization of a fixed amount of data is completed, the synchronization method is switched to a query transmission method. The query transmission method is a method for transmitting an update-related query executed in the DBMS to a synchronization destination (migration destination), and re-executing the query at the synchronization destination (migration destination) to realize synchronization of data.

This query transmission method is performed based on the following procedure.

At first, the update record extraction unit 203 stops update of the synchronization management table 206, and at the same time, a non-synchronized record extraction unit 204 and an update log extraction unit 205 start respective processes. The non-synchronized record extraction unit 204 extracts a record set to "non-synchronized." in the synchronization management table 206 from the data stored in the user table 102 at the time when update is stopped, and stores the same in a non-synchronized file 207.

A general DBMS requires a fixed amount of time from the execution of the update-related query to the output of a corresponding transaction log. Accordingly, immediately after the non-synchronized record extraction unit 204 has started extracting data, the transaction log corresponding to an update-related query executed before starting data extraction is output from the DBMS 101. The update log extraction unit 205 stores the transaction log in a difference log 208 up to the point where the non-synchronized record extraction unit 204 starts extracting data.

When the non-synchronized record extraction unit 204 completes extracting data, the synchronization processing unit 201 transmits the extracted non-synchronized file 207 and the difference log 208 in order to the synchronization management server 400 of a synchronization destination (migration destination) site. Further, the update log extraction unit 205 creates an update log 209 based on a transaction log and a query log output by the DBMS 101.

Generally, there are two types of update-related queries, which area a query where a same operation is always performed when re-executed (determinate query) and a query where operation is changed when re-executed (non-determinate query). The update log extraction unit 205 determines whether the query is determinate or not, and if determinate, it states a query log in the update log 209, and if indeterminate, it states a transaction log in the update log 209.

When the transmission of the difference log 208 is completed, the synchronization processing unit 201 starts transmitting the update log 209. In the present specification, the synchronization method after transmitting the difference log 208 is referred to as a query transmission method.

As described, according to the present embodiment, synchronization is performed via a table method at the initial state of the synchronization process, and the method is switched to the query transmission method at the final stage, so as to reduce the amount of data transfer required for the synchronization process.

In the following description, the preferred embodiment of the present invention will be described in detail.

Figure 2:
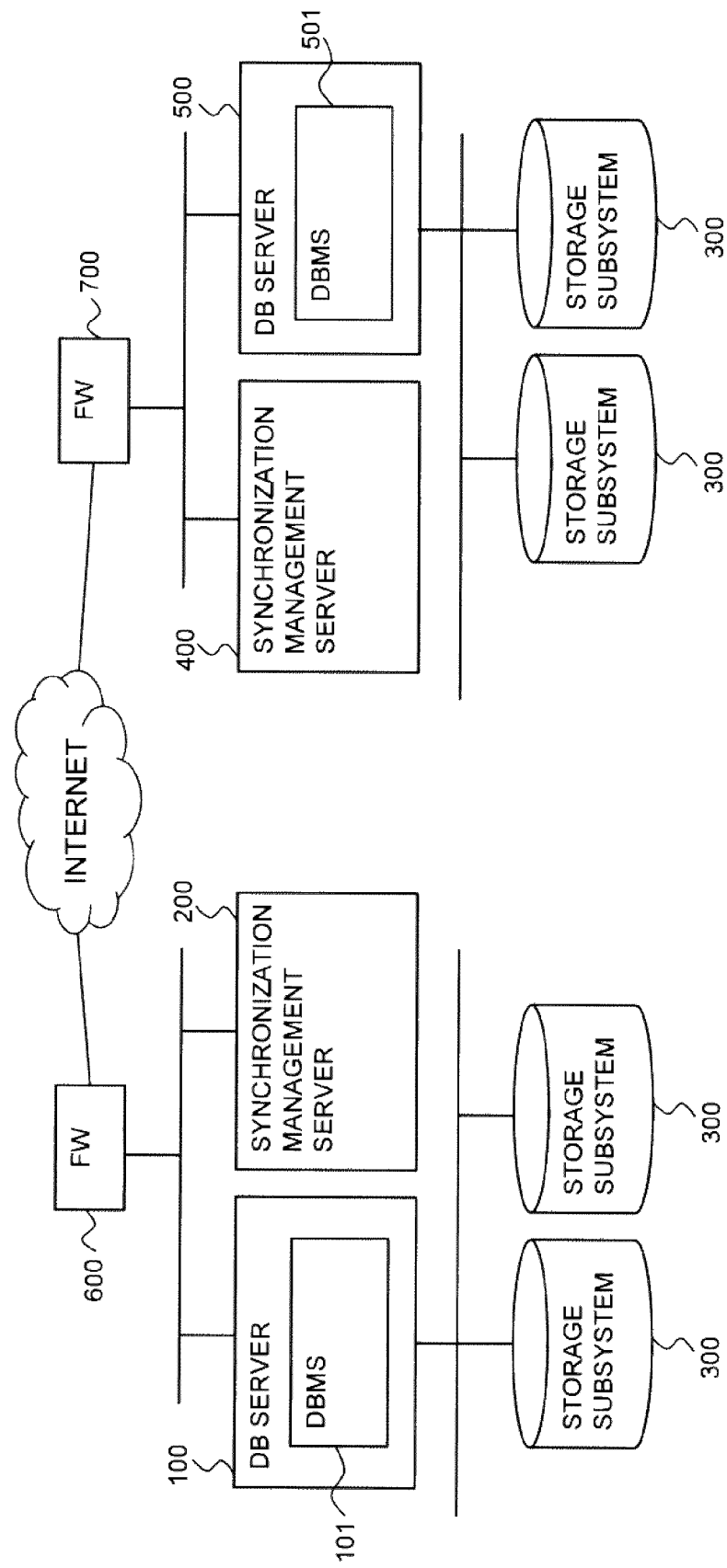
FIG. 2 is a configuration diagram of an overall system according to the present embodiment.

FIG. 2 is a view illustrating a configuration of an overall system according to the present embodiment. The DB server 100 and the synchronization management server 200 are located in a synchronization source (migration source) site, and are mutually connected via a common network, such as an Ethernet. The synchronization management server 200 can access the Internet through a FW (firewall) 600.

Similarly in the synchronization destination (migration destination) site, the DB server 500 and the synchronization management server 400 are mutually connected via a network, and the synchronization management server 400 can access the Internet via a FW 700.

The synchronization between the DB servers 100 and 500 is realized by the synchronization management servers 200 and 400 communicating via the Internet. The DB servers 100 and 500 are connected via a SAN (Storage Area Network) with multiple storage subsystems 300 within each site, and the data of the user table 102 illustrated in FIG. 1 is stored in the storage subsystems 300.

The DBMS 101 and 501 operating in the DB servers 100 and 500 are general database software. In the present embodiment, the DBMS corresponds to SQL as database language, and has a function of outputting to history of the executed SQL query (SQL query log) and outputting an update log in record units corresponding to the result of execution of the update-based SQL query. However, the present embodiment can be applied to other configurations (for example: KVS (Key-Value Store)) as long as the database can output a query log and a transaction log.

FIG. 3 is a view illustrating a software configuration of the synchronization management servers 200 and 400. FIG. 3 has a switch determination unit 202, a transaction table 210, a record log table 211 and a query log table 212 added to the outline view illustrated in FIG. 1.

During synchronization via the table method, the switch determination unit 202 calculates a remaining synchronization time when synchronization via the table method is to be continued as it is, and a predicted value of a remaining synchronization time when the synchronization method is switched to the query transmission method. If it is predicted that the remaining synchronization time is shorter when switched to the query transmission method, the synchronization method is switched.

The transaction table 210 manages the list of executed transact and the relationship between transactions and queries.

The record log table 211 records the contents of the transaction log output by the DBMS 101.

The query log table 212 records the contents of the query log output by the DBMS 101.

The functions of other modules in the synchronization management server 200 are already described with respect to FIG. 1, so they will not be described here.

Figure 17:
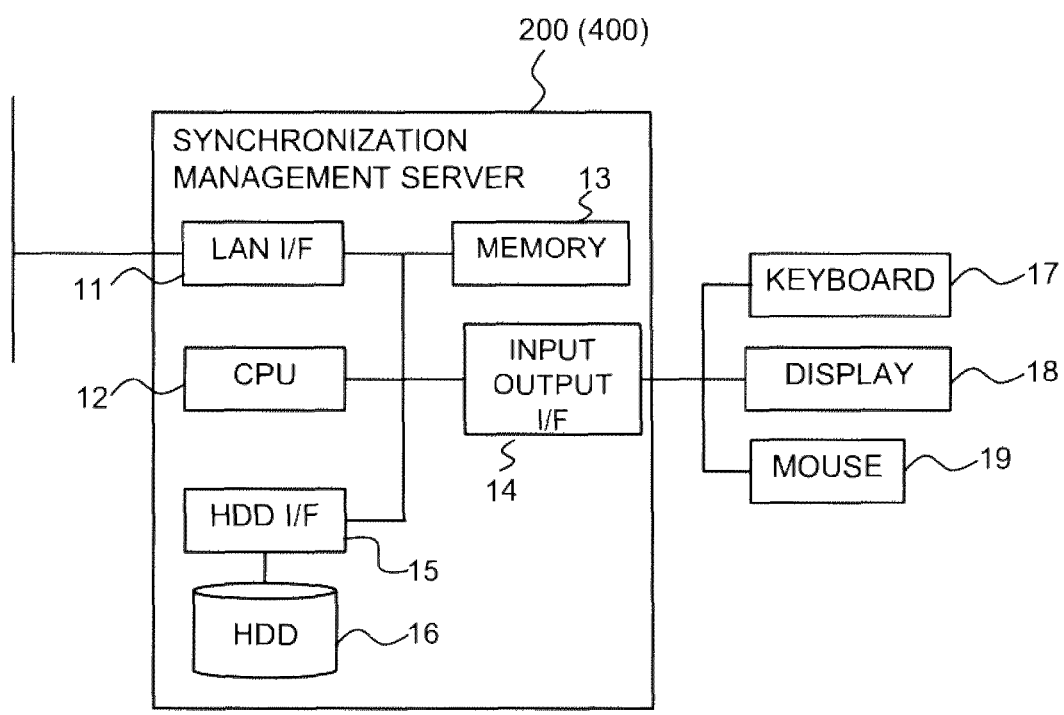
FIG. 17 is a hardware configuration diagram of a synchronization management server.

FIG. 17 is a view illustrating a hard configuration of the synchronization management servers 200 and 400. A LAN I/F 11, a CPU 12, an HDD I/F 15, a memory 13 and an input-output I/F 14 are mutually connected via an internal bus, and an HDD 16 is connected to the internal bus via the HDD 15. Further, it communicates with an external network via the LAN I/F 11.

The programs of various software components 201 through 205 described earlier are stored in the HDD 16, which are read into the memory 13 when necessary, and executed by the CPU 12. Further, the data in the various tables and logs 206 through 212 are stored in the HDD 16, which are read into the memory 13 and used when necessary.

A keyboard 17, a display 18 and a mouse 19 are connected via the input-output I/F 14, which are used for confirming the progress of setup of various software or the synchronization processes. For example, if the execution statuses of various modules 201 through 205 (such as the synchronization method being executed or the amount of data being transmitted) in the synchronization management server 200 is set to be displayed on the management screen in the display 18, the administrator can confirm the status of progress of the synchronization process (such as the percentage of progress compared to the whole process) or specify the location of occurrence of failure when failure has occurred.

FIG. 4 is a view illustrating a synchronization management table 206. The synchronization management table 206 is composed of a KEY, a deletion flag, an update frequency and a synchronization flag.

The KEY is an identifier of a record, and usually, a primary key of a record stored in the user table 102 is used as the KEY.

The deletion flag shows whether a record that has existed in the user table 102 has been deleted or not at any timing during synchronization. That is, if a certain record is transmitted to the DBMS 501 of the synchronization destination (migration destination), and that record is deleted thereafter in the DBMS 101 of the synchronization source (migration source), it must be notified to the DBMS 501 that the record has been deleted, and the record must also be deleted in the DBMS 501 to perform resynchronization, so that the deletion flag is used to perform this control.

The update frequency refers to the update frequency of the respective records, which is acquired in advance as a statistical information before starting the synchronization process.

The synchronization flag shows whether the corresponding record has been synchronized or not.

FIG. 5 is a view illustrating one example of a query log output by the DBMS 101. The query log is composed of a Timestamp, an SID and an SQL. A Timestamp shows the time when an SQL query has been executed, an SID is a session ID for identifying the connection with the client issuing the SQL query, and SQL is the main body or the issued SQL query.

In the SQL, CONNECT and DISCONNECT are log events related to the connection with the client, and SID is defined in the section sandwiched therebetween.

BEGIN TRANSACTION shows the start of a transaction, and COMMIT shows the end of a transaction, wherein the section sandwiched therebetween corresponds to a single transaction.

Therefore, one or more transactions can be executed during a single session. Moreover, by executing a SET TRANSACTION ISOLATION LEVEL before BEIN TRANSACTION, a transaction isolation level can be set.

FIG. 6 illustrates one example of a transaction log output by the DBMS 101.

The transaction log is a record-unit log indicating the contents of update that has occurred as a result of executing an update-related SQL, and the result of a reference-related SQL query, such as select, will not be output. The transaction log is composed of a Timestamp, TID, an Operation, a KEY and a VALUE.

A Timestamp shows the time at which an incident has occurred, a TID is a transaction ID, and an Operation is the content of the process. The Operation includes an insert (addition of a record), update (update of a record), a delete (deletion of a record) and other record operations in the table, and further includes a start (begin transaction) and an end (end transaction).

A KEY shows a primary key section out of the data constituting a record, and VALUE refers to the remaining data constituting a record. In the case of an insert, all the data of records being added are recorded. In case of update, a record updated by the KEY is identified, and the updated data is stored in the VALUE. Further, if the KEY itself is to be updated, insert will be executed after delete. In case of delete, the record to be deleted is identified using the KEY.

FIG. 7 is a view illustrating a transaction table. The transaction table 210 is composed of a Start Time, a TID, an SID and an End Flag.

A Start Time shows the start time of transaction, and it stores the Timestamp of a to event where the operation of the transaction log is start.

A TID is a transaction ID, and the TID of the log event is stored.

An SID is a session ID related to the connection with a client issuing the SQL query. By recording the relationship between the TID and the SID, the corresponding relationship between the transaction and the SQL query will be managed.

An End Flag is a flag indicating whether as transaction has been ended or not, where flag "1" is registered when a log event where the TID corresponds in the transaction log and the operation is set to end is output.

FIG. 8 is a view illustrating a record log table. The record log table 211 is composed of a Timestamp, a TID, an OP, a KEY, a VALUE and a difference Flag, wherein log events accompanying the change of record (where the operation is set to insert/update/delete) out of the log events of the transaction log output by the DBMS 101 are stored therein. The Timestamp, the TID, the Operation, the KEY and the VALUE of a transaction log are recorded respectively in the Timestamp, the TID, the OP, the KEY and the VALUE entries. The difference Flag is used to determine whether it should be store in the difference log 208 or not during the switching process of the synchronization method.

FIG. 9 is a view illustrating a query log table. The query log table 212 is composed of a Timestamp, an SID, a TLV and a QUERY, wherein query logs that accompany the change of record (where the operation is insert/update/delete) and those related to the starting and ending of a transaction out of the query logs output by the DBMS 101 are stored therein.

The Timestamp, the SID and the QUERY respectively correspond to the Timestamp, the SID and the SQL of the query log (FIG. 5), and the contents of the query log are stored as they are.

The TLV is a transaction isolation level, wherein when a "SET TRANSACTION ISOLATION LEVEL" is output by the query log, the transaction isolation level during use is stored per session, and when a different query log is output, the transaction isolation level of that session is set to TLV. The interpretation of the query log and the setting of the TLV are performed by the update log extraction unit 205.

Next, we will describe the synchronization method using the table method.

Figure 10:
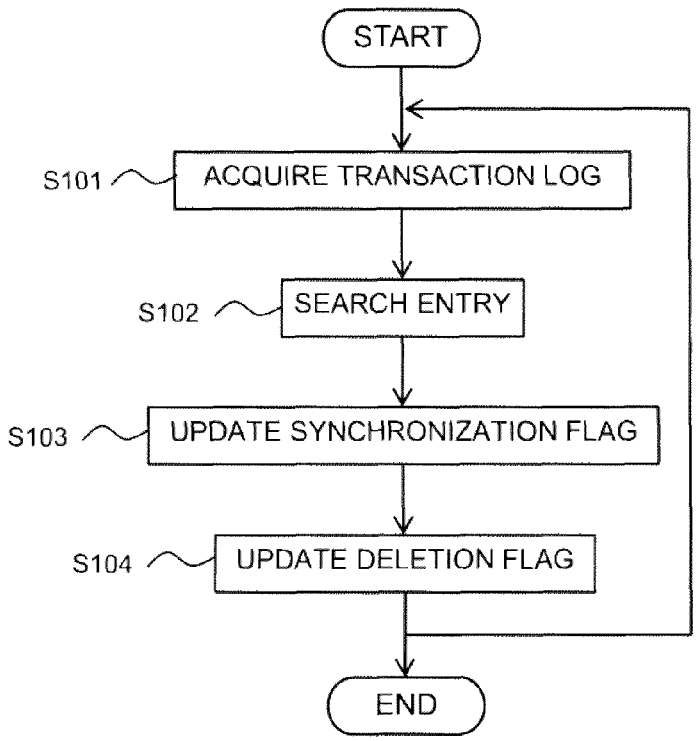
FIG. 10 is a view illustrating a process of an update record extraction unit during synchronization via a table method.

FIG. 10 is a view illustrating a process flow in an update record extraction unit during synchronization via the table method. Before synchronization using the table method is started, entries related to records stored in the user table 102 being the target of synchronization in the DBMS 101 are created in the synchronization management table 206. Especially, since the update frequency is a statistical information, it will take a few days or more to create the same. Before starting synchronization, the deletion flag is set to "non-deleted" and the synchronization flag is set to "non-synchronized" in all entries of the synchronization management table 206.

When synchronization via the table method is started, in step S101, the update record extraction unit 203 acquires a transaction log related to the oldest record update out of the transaction logs output by the DBMS 101. Further, log events that are not related to record update are abandoned.

Next, in step S102, the update record extraction unit 203 refers to the KEY of the transaction log acquired in step S101, and searches for an entry having the same KEY in the synchronization management table 206. If there is no such entry, an entry having a corresponding KEY is newly created, wherein the deletion flag is set to "non-deleted", and the synchronization flag is set to "non-synchronized". The update frequency is set to a default value set in advance.

In subsequent step S103, the update record extraction unit 203 confirms the "synchronization flag" of the entry searched in step S102, and if it is set to "synchronized", it is updated to "non-synchronized". If an entry is newly created in step S102, no operation is performed in this step.

If the Operation of the transaction log acquired in step S101 is "delete", then in step S104, the update record extraction unit 203 changes the deletion flag in the synchronization management table 206 searched in step S102 to "deleted".

As described, the update record extraction unit 203 repeatedly executes the processes of steps S101 through S104 every time a transaction log is output.

The synchronization processing unit 201 refers to the synchronization management table 206, and searches for the entry where the update frequency is smallest out of the entries where the synchronization flag is set to "non-synchronized". This is the synchronization target record. The synchronization processing unit 201 acquires a record where the KEY of the entry correspond from the DBMS 101, and transmits the same to the synchronization management server 400 of the synchronization destination (migration destination) site. Multiple records can be transmitted simultaneously in order to reduce communication overhead.

Next, a procedure for switching the synchronization method from the table method to the query transmission method will be described.

During switching of the synchronization method, the non-synchronized record extraction unit 204 refers to the synchronization management table 206, and acquires a list of records where the synchronization flag is set to "non-synchronized" from the DBMS 101. When READ ONLY is designated as the transaction isolation level, if there is a transaction being executed at the point of time the READ ONLY transaction is started, a normal DBMS can read the data in a state where the result of a transaction being executed is still not reflected.

By using this function, the non-synchronized record extraction unit 204 acquires the data corresponding to the interval between transactions as the non-synchronized record, and transmits the same to the synchronization destination (migration destination) site. Thereby, the database at the synchronization destination (migration destination) site can be in the same state as a certain stationary point of the synchronization source (migration source) site. Thereafter, synchronization is started by the query transmission method.

However, as described below, the above-described process cannot be simply executed, due to influences such as a time lag in the output timing of logs.

Figure 11:
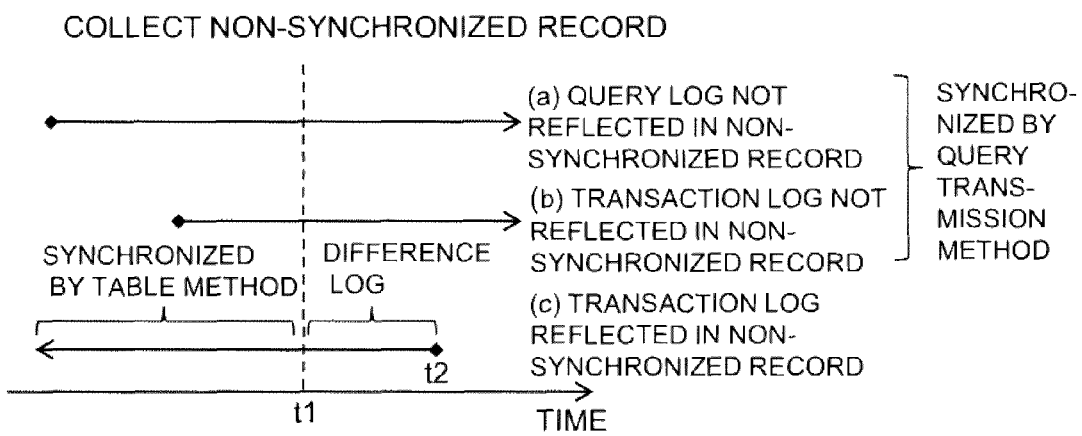
FIG. 11 is a view illustrating a time series relationship of logs processed during switching of the synchronization method.

FIG. 11 is a view illustrating a time-series-like relationship of the logs output by the DBMS 101. The time in which a non-synchronized record has been acquired is referred to as t1. FIG. 11 (a) shows a query log corresponding to the transaction being executed at time t1 and the transaction started after time t1. FIG. 11 (b) shows a transaction log corresponding to the query log of (a). In FIGS. 11, (a) and (b) are transmitted by the query transmission method after a non-synchronized record is transmitted to the synchronization destination (migration destination) site. FIG. 11 (c) shows as transaction log whose execution result is reflected in the non-synchronized record. Generally, a DBMS outputs a transaction log later than a query log, so that this transaction log is output until time t2 after time t1. Therefore, time t2 called a transaction demarcation point.

The non-synchronized record extraction unit 204 determines a KEY list of the non-synchronized record based on the synchronization management table 206 at time t1, but at time t1, only the results of the past transaction logs are reflected in the synchronization management table 206. Therefore, even if a new record has been added by a transaction log output between time t1 and time t2, it will not be reflected in the above-mentioned KEY list. Therefore, addition of a new record included in the transaction log output between time t1 and time t2 will be separately transmitted as a difference log.

Figure 12:
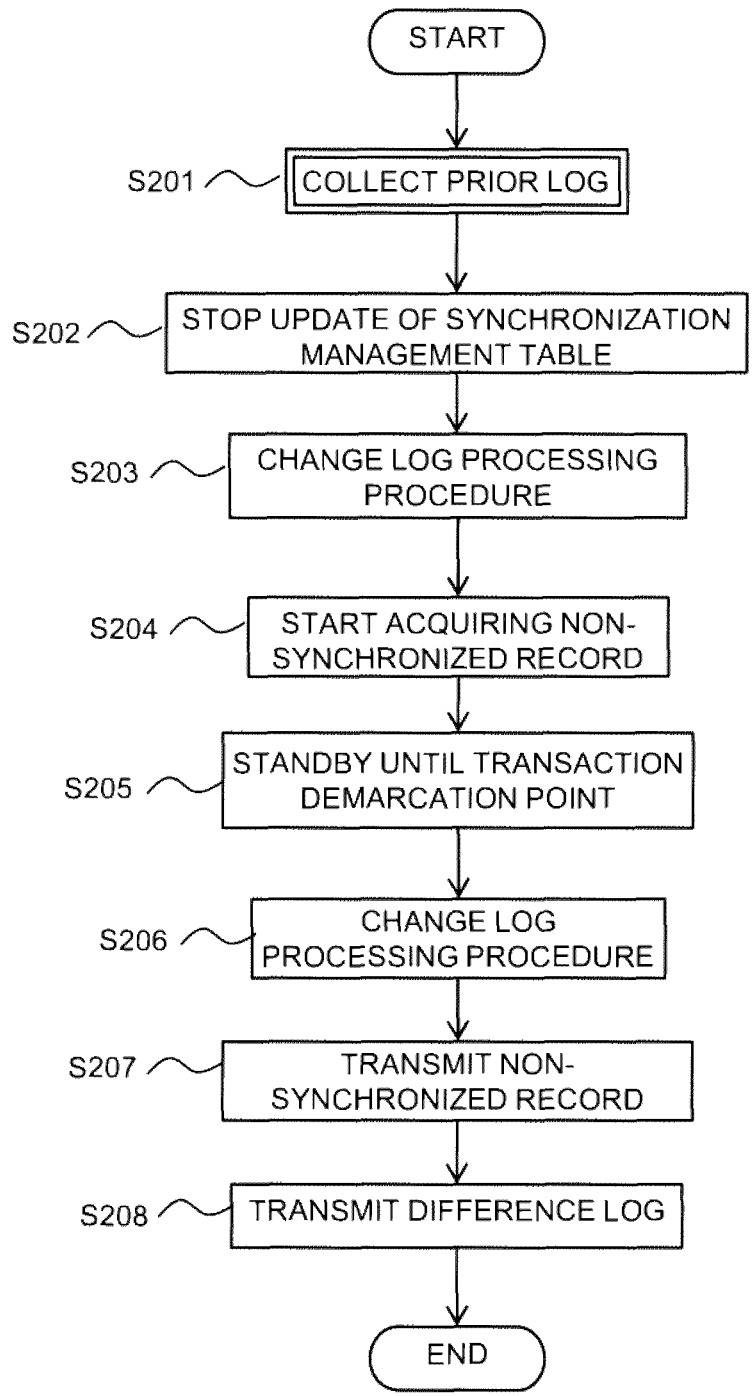
FIG. 12 is a view illustrating an overall flow of the switching process.

Next, we will describe the actual procedure for switching the synchronization method. FIG. 12 is a view illustrating an overall flow of the process for switching the synchronization method.

Before actually starting the switching process, at first in step S201, a prior log collecting process is executed. The update log extraction unit 205 updates the transaction table 210 based on the query log and the transaction log output by the DBMS 101, and stores a portion of the logs in the record log table 211 and the query log table 212. This process becomes necessary since the query log and the transaction log of FIGS. 11 (a) and (b) are output at a time prior to the time when the non-synchronized record is collected.

Figure 13:
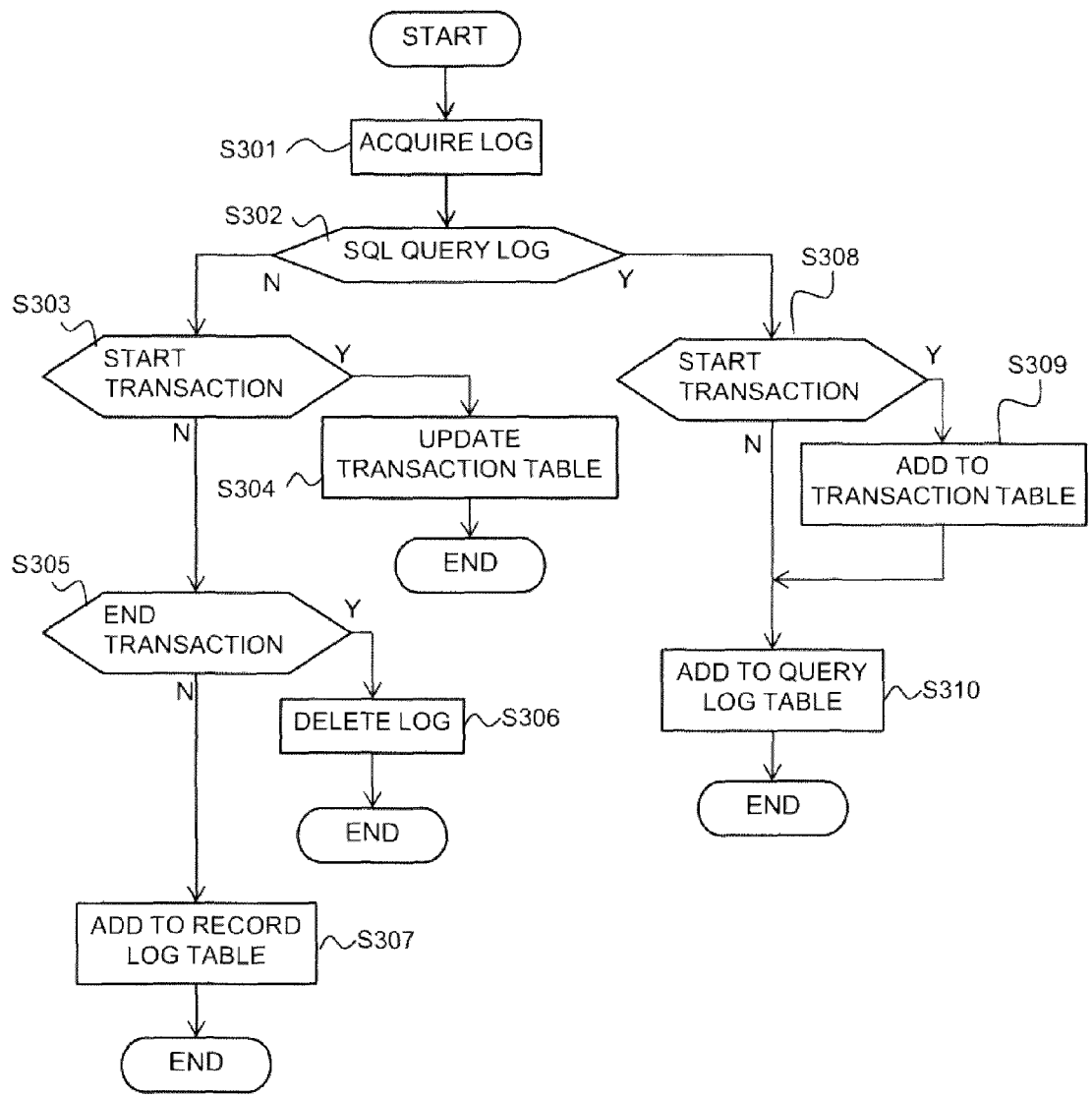
FIG. 13 is a view illustrating a prior log collecting process flow prior to executing the switching process.

Therefore, based on FIG. 13, the details of the process of step S201 (prior log collecting process) will be described. FIG. 13 is a view showing the prior log collecting process flow before executing the switching process.

In step S301, the update log extraction unit 205 acquires a log from the DBMS 101.

In step S302, the update log extraction unit 205 determines whether the acquired log is an SQL query log or not, and if it is an SQL query log (Y), the procedure advances to step S308.

In step S308, the update log extraction unit 205 determines whether the above-acquired log is a begin transaction (BEGIN TRANSACTION) or not. If it is a begin transaction (Yes), then in step S309, the update log extraction unit 205 adds a new entry to the transaction table 210, wherein the Timestamp of the log is registered as the Start Time of the entry, and the SID of the log is registered as the SID of the entry. No data is registered in the remaining fields of the entry.

Thereafter in step S310, the update log extraction unit 205 adds the query log to the query log table 212 and ends the process. Here, the data stored in the "SET TRANSACTION ISOLATION LEVEL" query immediately before the log event having the same SID is stored in the TLV of the query log table 212.

In step S302, if the acquired log is a transaction log (N), the procedure advances to step S303.

In step S303, the update log extraction unit 205 determines whether the log is a begin transaction (start) or not, and if it is a begin transaction (Y), then in step 304, it searches the transaction table 210 for an entry where the Start Time in the transaction table 210 corresponds to the Timestamp of the Log. The TID of the log is set to the TID of the entry found by this search.

If the to is not a begin transaction (N), then in step S305, the update log extraction unit 205 determines whether the log is an end transaction or not, and if it is an end transaction (Y), it searches the transaction table 210 for an entry where the TID in the transaction table 210 corresponds to the TID of the log in step S306. After reading the SID and the Timestamp of the entry found here, the entry will be deleted.

Further, the update log extraction unit 205 searches the query log table 212 for entries where the SID in the query log table 212 is the same as the SID being read, and arranges the entries in the order of the Timestamp. The entry having the above-described Timestamp out of the entries found here corresponds to the begin transaction (BEGIN TRANSACTION) query, and the entry storing the end transaction (COMMIT) query output immediately thereafter is included in the section related to the transaction. Therefore, the update log extraction unit 205 deletes this section from the query log table 212.

Further, the update log extraction unit 205 deletes a group of entries where the TID in the record log table 211 correspond to the above-mentioned TID from the table 211 and ends the process.

If the above-mentioned log is neither begin transaction nor end transaction ("N" in step S305), the contents of update of the record is stored in the log, and in step S307, the update log extraction unit 205 adds this log to the record log table 211 before ending this process.

As described, the update log extraction unit 205 executes the above process every time a query log or a transaction log is acquired from the DBMS.

Next, the procedure returns to FIG. 12, and the process for switching the synchronization method subsequent to the prior log collecting process will be described successively.

When the switch determination unit 202 determines to switch the synchronization method, then in step S202, the update record extraction unit 203 stops update of the synchronization management table 206. The processes of steps S202 through S204 are performed atomically, and the time when these processes are executed corresponds to t1 of FIG. 11.

Thereafter, in step S203, the update log extraction unit 205 partially changes the procedure of the log collecting process described with reference to step S201 and FIG. 13. That is, as shown in FIG. 11, since the transaction to output during time t1 and t2 are sent afterwards without being deleted, they must be temporarily stored as a difference log.

Further, since the transaction log whose output time is prior to t1 is synchronized via the table method, there is no need to record the same. Actually, in the addition process to the record log table of step S307 of FIG. 13, the update log extraction unit 205 is corrected to add an entry having the difference Flag set to "1" in the record log table 211 (the difference Flag is not set prior to correction). Further, in the log deletion process of step S306, if the difference Flag of the entry to be deleted from the record log table 211 is "1", the update log extraction unit 205 moves the data of that entry to the difference log 208, and thereafter, deletes the entry from the record log table 211. The entry whose difference. Flag is not set is deleted as according to the prior process.

Next, in step S204, the non-synchronized record extraction unit 204 extracts all the entries where the synchronization flag is set to "non-synchronized" and the deletion flag is set to "non-deleted" from the synchronization management table 206. A process is started to acquire the group of records having the KEYs of these entries from the DBMS 101 and save the same in the non-synchronized file 207.

Next, in step S205, the update log extraction unit 205 waits until the transaction log after time t1 (FIG. 11) having executed steps S202 through S204 is output from the DBMS 101, that is, until time t2, which is a transaction demarcation point. Also during this standby, the update of the transaction table 210, the record log table 211 and the query log table 212 described previously are continued.

When the transaction log those Timestamp is later than time t1 is output, the transaction logs output thereafter are logs corresponding to FIG. 11 (b), and they correspond to data that should be synchronized by the query transmission method.

In step S206, the update log extraction unit 205 re-changes the procedure of the log collecting process described with reference to step S201 and FIG. 13, so that the transaction log is moved to the update log instead of to the difference log. Actually, the portion of step S306 of FIG. 13 is changed to the process illustrated in FIG. 14 described later.

Next, in step S207, the non-synchronized record extraction unit 204 extracts from the synchronization management table 206 all the entries having the synchronization flag set to "non-synchronized" and the deletion flag set to "deleted", and transmits the KEY of the entries via the synchronization processing unit 201 to the synchronization processing unit 401 of the synchronization destination (migration destination) site. Then, the records having the above-mentioned KEY are deleted from the DBMS 501 of the synchronization destination (migration destination) site. When the saving process of the non-synchronized file 207 started in step S204 is completed, the non-synchronized record extraction unit 204 transmits the non-synchronized file 207 via the synchronization processing unit 201 to the synchronization processing unit 401 of the synchronization destination (migration destination) site.

Next, in step S208, the update log extraction unit 205 transmits the difference log 208 via the synchronization processing unit 201 to the synchronization processing unit 401 of the destination (migration destination site. In this step, out of the entries stored in the difference log, there is no need to transmit (A) the update log which has been re-updated at a later time and (B) the update log including a record having the same KEY in the non-synchronized file 207, so that the amount of transmission of data can be cut down by not having to transmit (A) and (B).

By the above steps, the synchronization method switching process is completed. Thereafter, the update log extraction unit 205 performs synchronization using the query transmission method, by continuing the process where step S306 of FIG. 13 is changed to FIG. 14.

In the above-described processing procedure, the non-synchronized record extraction unit 204 starts to transmit the non-synchronized file 207 after acquiring the whole non-synchronized file 207, but it is possible to perform acquisition and transmission of the non-synchronized file 207 at the same time. As described, by using the non-synchronized file 207 as a buffer, the network bandwidth between sites can be utilized efficiently.

Next, we will describe the synchronization process performed via the query transmission method.

Figure 14:
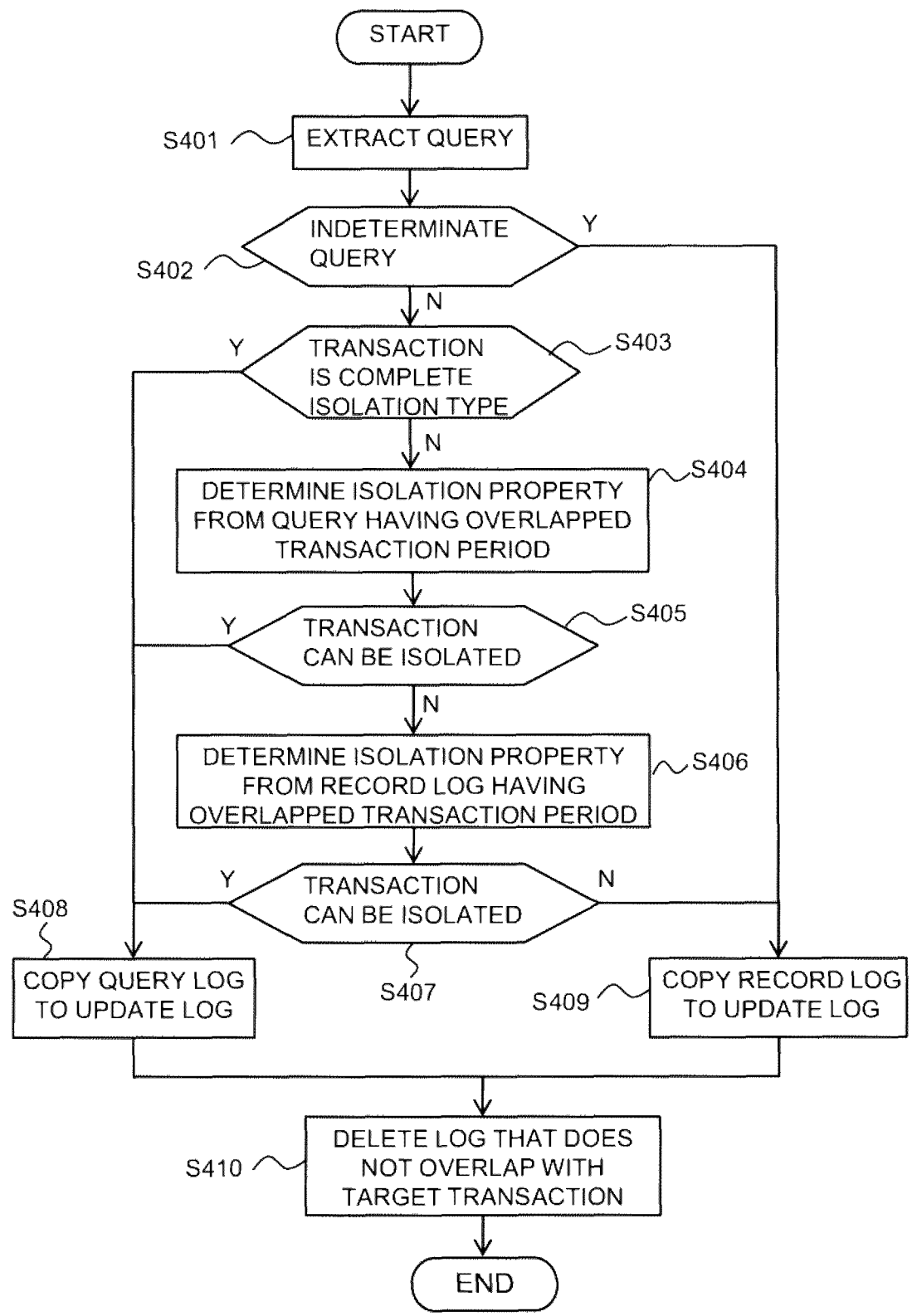
FIG. 14 is a view illustrating an update log creating process flow via an update log extraction unit during synchronization via a query transmission method.

FIG. 14 is a view of a process flow for creating an update log via the update log extraction unit which is synchronized via the query transmission method. When a transaction log corresponding to the end transaction is output, step S306 of FIG. 13 (that is, the process flow of FIG. 14) is executed. At this point of time, the log of the whole transaction of the processing target is included in the record log table 211 and the query log table 212. According to the process flow of FIG. 14, it is confirmed whether the query log out of the above-mentioned logs operates in the same manner as the synchronization source (migration source) site when re-executed in the DBMS 501 of the synchronization destination (migration destination) site, and if it operates in the same manner, the query log is transmitted to the synchronization destination (migration destination) site. If it may not operate in the same manner, the transaction log is transmitted to the synchronization destination (migration destination) site. Hereafter, the steps of the process flow illustrated in FIG. 14 will be described.

In step S401, when a transaction log corresponding to an end transaction is output, the update log extraction unit 205 extracts all query logs corresponding to the transaction from the query log table 212 based on the TID included in the transaction log by a similar procedure as the procedure described in step S306 of FIG. 13.

In the subsequent step S402, the update log extraction unit 205 confirms the SQL sentences of the query logs extracted in step S401 one sentence at a time, and confirms whether it includes an SQL sentence that can be determined as being non-determinate (whose behavior differs every time it is re-executed) by a single sentence or not. Examples of such SQL sentence satisfying the conditions can be a SQL sentence generating random numbers or as SQL sentence for acquiring the current time. When such SQL query is included (Y), the procedure advances to step S409 to transmit the transaction log to the synchronization destination (migration destination).

When it is determined in step S402 that individual queries are determinate (whose behavior is the same regardless of how many times it is re-executed) (N), then in step S403, the update log extraction unit 205 confirms whether the transaction isolation level of the query extracted in step S401 is at a level completely isolated from other transactions whose transaction execution periods overlap.

For example, four types of transaction isolation levels, which are SERIALIZABLE, REPEATABLE READ, READ COMMITTED, and READ UNCOMMITTED, are determined according to ANSI/ISO SQL standards, wherein only SERIALIZABLE is completely isolated from other transactions whose transaction execution periods overlap.

As described, if the respective SQL sentences are determinate, rind the transaction isolation level is at a level completely isolated from other transactions whose transaction execution periods overlap, the SQL query related to this transaction executed in the DBMS 501 of the synchronization destination (migration destination) necessary performs the same operation as in the DBMS 101 of the synchronization source (migration source). When these conditions (completely isolated type) are satisfied (Y), the procedure advances to step S408 to transmit the query log to the synchronization destination (migration destination).

In step S403, if the transaction isolation level is not a complete isolation type (N), then in step S404, the update log extraction unit 205 sorts the entries of the query log table 212 in the order of the Timestamps per SID, and refers to the log entries of the begin transaction (BEGIN TRANSACTION) and the end transaction (COMMIT) per SID, to calculate the execution period of the transaction being executed or having completed execution. Then, the update log extraction unit 205 performs the following processes (1) through (3). (1) Extract the SQL query of other transactions whose execution period overlaps with the present transaction. (2) Obtain a table list in the DBMS 101 referred to during the present transaction based on the SQL query sentence corresponding to the present transaction. (3) Obtain a table list to which the other transaction having the execution period overlap with the present transaction has written data based on the SQL query sentence.

In the subsequent step S405, the update log extraction unit 205 determines the isolation possibility of the present transaction, and if other transactions whose execution periods overlap with the present transaction have not written data in the table referred to during the present transaction, the present transaction can be isolated from the other transactions whose execution period overlap therewith (Y), so the procedure advances to step S408 to transmit the query log to the synchronization destination (migration destination).

If it is determined in step S405 that the present transaction has a possibility of not being able to be isolated from other transactions whose execution periods overlap therewith (N), then in step S406, the update log extraction unit 205 sorts the entries of the record log table 211 per TID in the order of the Timestamps, and extracts a transaction log list of other transactions whose execution periods overlap with the present transaction.

Then, in step S407, the update log extraction unit 205 confirms whether the other transactions whose execution periods overlap therewith regarding the records referred to by the present transaction performs data write, and determines the isolation possibility of the transaction. Here, the identification of records is performed using the KEY of the record log table 211. If there is no such access, the present transaction can be isolated from the other transactions whose execution periods overlap (Y), so that the update log extraction unit 205 advances to step S408 to transmit the query log to the synchronization destination (migration destination). If the present transaction cannot be isolated (N), the update log extraction unit 205 moves on to step S409 to transmit the transaction log to the synchronization destination (migration destination).

According to the above-described flow, in step S408 for transmitting the query log to the synchronization destination (migration destination) (when step S403, S405 or S407 is "Y"), the update log extraction unit 205 copies the query log extracted in step S403, S405 or S407 to the update log 209.

On the other hand, in step S409 for transmitting the transaction log to the synchronization destination (migration destination) in the above flow (step S402 is "Y" or step S407 is "N"), the update log extraction unit 205 extracts the logs of the whole process target transaction from the record log table 211 based on the TID of the process target transaction determined in step 402 or step 407, and copies the same to the update log 209.

Then, the to copied to the update log 209 in step S408 or S409 is asynchronously transmitted by the synchronization processing unit 201 to the synchronization destination (migration destination).

As described, according to the update log creating process, the update log is created so as to sequentially sift those requiring lighter processing loads to those requiring heavier processing loads in that order, so that the processing load can be reduced compared to the case where the isolation possibility of the transaction must be determined based only on the record log, for example.

Lastly, in step S410, the update log extraction unit 205 deletes the entry corresponding to the transaction whose execution period does not overlap with the target transaction and the execution period is earlier than the target transaction from the transaction table 210, the record log table 211 and the query log table 212. Regarding the record log table 211 and the query to table 212, the log satisfying the above-described conditions can be obtained based on a similar method as the process described in steps S404 and S406. As for the transaction table 210, by searching an entry whose TID corresponds to the entry being the delete target in the record log table 211 from the transaction table 210, the delete target entry can be determined.

Next, we will describe the method in which the switch determination unit 202 determines the method for switching the synchronization method.

The switch determination unit 202 periodically calculates the remaining synchronization time of the case where synchronization is continued based on the table method and the case where synchronization is performed by switching to the query transmission method, and if the remaining synchronization time is shorter if switched to the query transmission method, it instructs switching of the synchronization method.

The synchronization time of the table method is calculated through Simulation. In the simulation, it is assumed that the system statuses such as the line speed between sites and the update frequency of the records are fixed, and transmission of a fixed amount of records (five records, for example) in a single step of the simulation is simulated. Since the line speed between sites is assumed to be fixed, the time required to perform a single step is fixed. Based on the required time of the single step and the update frequency entered in the synchronization management table 206, the probability of each record being updated in as single step can be calculated. Based on this probability, the update of each record per single step is simulated. In the simulation, the number of steps required for synchronization is finally calculated, but since the time per single step is fixed, the time required for synchronization can be calculated.

Figure 15:
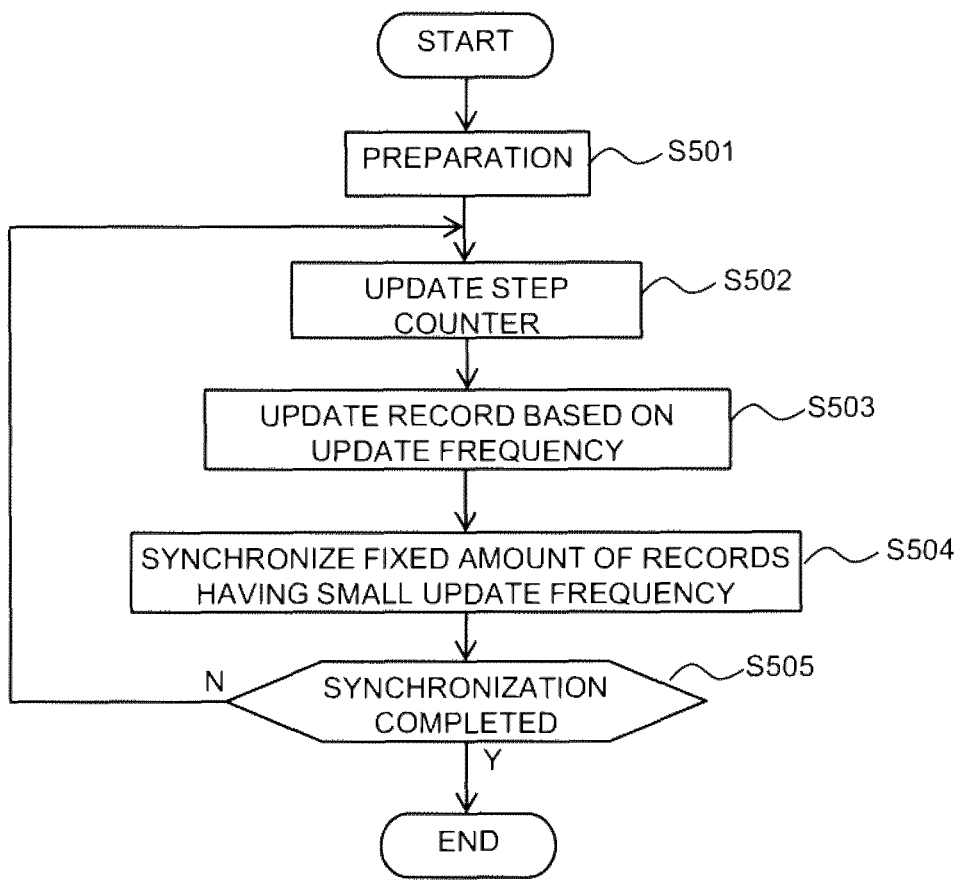
FIG. 15 is a view illustrating a process flow for calculating a remaining synchronization tune via a table method.

In the following description, the procedure of simulation of the process for calculating the remaining synchronization tune according to the table method illustrated in FIG. 15 will be described.

At first, in step S501, the switch determination unit 202 prepares to copy the synchronization management table 206. In the following description, the copying of the synchronization management table 206 is simply referred to as the synchronization management table 206.

In step S502, the switch determination unit 202 increments the step counter.

Thereafter, in step S503, the switch determination unit 202 calculates the update probability for each record corresponding to the entry stored in the synchronization management table 206, and determined whether to update each record based on this probability. The synchronization flag of the entry corresponding to the record determined to be updated is updated to "non-synchronized".

Next, in step S504, the switch determination unit 202 selects a fixed number of entries having a small update frequency from the entries in which the synchronization flag is set to "non-synchronized" in the synchronization management table 206, and sets the synchronization flags of these entries to "synchronized".

In step S505, the switch determination unit 202 repeats the processes of steps S502 through S504 until the synchronization flags of all entries in the synchronization management table 206 are set to "synchronized" and synchronization is completed, and when synchronization is completed (Y), ends the simulation. Then, the switch determination unit 202 acquires the number of steps required to end this simulation from the step counter, and calculates the time required for synchronization by the product thereof with the time required per one step.

Figure 16:
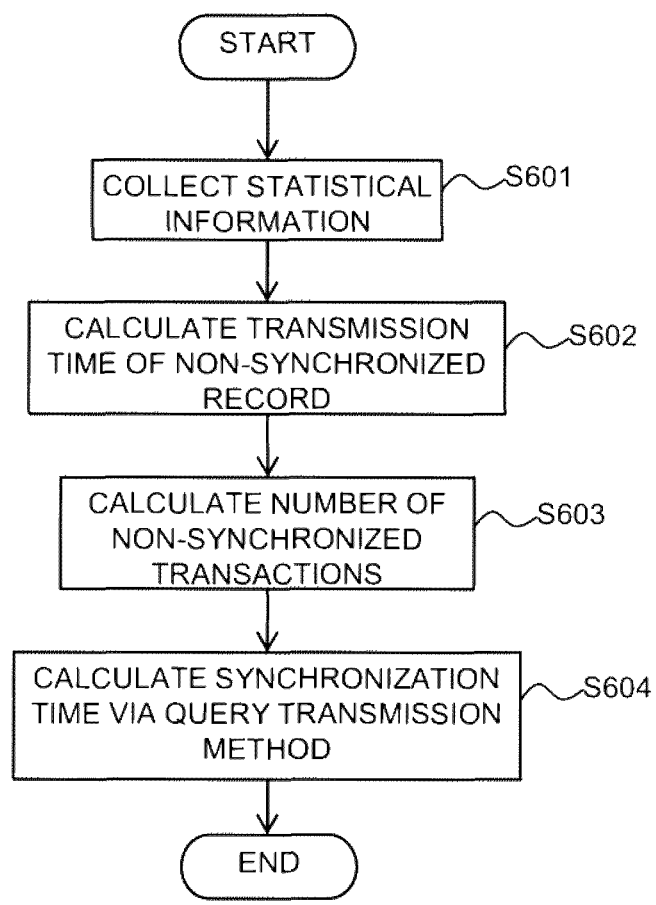
FIG. 16 is a view illustrating a process flow for calculating a remaining synchronization time when switched to the query transmission method.

On the other hand, the synchronization time of the query transmission method is calculated based on the statistical information. The calculation process thereof is described based on a calculation process flow of the remaining synchronization time when the system is switched to the query transmission method illustrated in FIG. 16.

As step S601, the switch determination unit 202 gathers the following statistical information before performing the synchronization process. The gathering of these information normally requires a few days or more time.

B=Average communication bandwidth used for inter-site data synchronization
D=Average amount of data per record
Ta=Average number of transactions per time
Pq=Ratio of transactions capable of being subjected to SQL query transmission
St=Amount of data of update record per transaction
Sq=Amount of data of updated query per transaction Of the above-listed statistical information, B can be acquired from the communication log, and the other information can be acquired from the query log and the transaction log output from the DBMS 101.

Next, in step S602, the switch determination unit 202 obtains the number of records (number of non-synchronized records) corresponding to the entry where the synchronization flag is set to "non-synchronized" in the synchronization management table 206. Then, based on the number of non-synchronized records and B and D of the above listed statistical information, a transmission time Tree of this non-synchronized record is calculated based on the following expression.

Transmission time of non-synchronized record(Trec)
=Number of non-synchronized records×$D/B$ Thereafter, in step S603, the switch determination unit 202 calculates a non-synchronized transaction number Ntran immediately after starting synchronization by the query transmission method, based on the previously calculated non-synchronized record transmission time Trec and the above-listed Ta of the statistical information.

Number of non-synchronized transaction(Ntran)=$Ta/Trec$

Thereafter, in step S604, the switch determination unit 202 computes the number of transactions capable of being transmitted per unit time in the query transmission method, so as to calculate the synchronization time in the query transmission method. At first, the switch determination unit 202 calculates the average time required to synchronize a single transaction based on the Pq, St, Sq and B of the above-listed statistical information using the following expression.

Average time required to synchronize one transaction=$\{Sq \times Pq + St \times (1-Pq)\}/B$ The number of transactions capable of being transmitted per unit time Tsend is the reciprocal thereof, so it can be obtained by the following expression.

Number of transactions capable of being transmitted per unit time $(Tsend)=B/\{Sq \times Pq + St \times (1-Pq)\}$ Now, if the synchronization time of the query transmission method is represented by Ts, the following expression holds.

$Ts \times Tsend = Ntran + Ts \times Ta$

Accordingly, the synchronization time Ts of the query transmission method can be expressed by the following expression.

Synchronization time of query transmission method $(Ts)=Ntran/(Tsend-Ta)$

Finally, the result of having added the non-synchronized record transmission time Trec and the synchronization time of query transmission method Ts (Trec+Ts) will be the remaining synchronization time when the system is switched to the query transmission method.

In the above-described calculation, the transmission time of the difference log is not included, but the time of output of the difference log is the time from when the SQL query is executed to the corresponding transaction log is output, which is sufficiently small compared to the transmission time of the non-synchronized file, so that it is ignored in the above calculation.

REFERENCE SIGNS LIST 100, 500: DB server
101, 501: DBMS
102, 502: User table
200, 400: Synchronization management server
300: Storage subsystem
600, 700: Firewall (FW)
201, 401: Synchronization processing unit
202: Switch determination unit
203: Update record extraction unit
204: Non-synchronized record extraction unit.
205: Update log extraction unit
206: Synchronization management table
207: Non-synchronized file
208: Difference log
209: Update log
210: Transaction table
211: Record log table
212: Query to table

The invention claimed is:
1. A database management system comprising:
databases for a synchronization source and a synchronization destination;
a management server for controlling data synchronization between databases of the synchronization source and the synchronization destination;
a table for storing entries at least including an identifier for identifying a record of the database of the synchronization source, and a synchronization flag indicating whether the record is non-synchronized or synchronized between the databases of the synchronization source and the synchronization destination;
wherein the management server
executes switching from a synchronization control based on a table method, which performs data synchronization between databases by transmitting the record where the synchronization flag extracted from the table is set to non-synchronized from the database of the synchronization source to the database of the synchronization destination, to a synchronization control based on a query transmission method, which utilizes an update log to perform data synchronization between databases by transmitting an update log extracted from the database of the synchronization source to the database of the synchronization destination; and
based on a non-synchronized status and a synchronized status indicated by the synchronization flag in the table, periodically calculates a remaining synchronization time when synchronization is continued based on the table method and a remaining synchronization time by switching to the query transmission method, and when it is determined that the remaining synchronization time by switching to the query transmission method is shorter based on the result of the calculation, sets a timing for executing the switching.

2. The database management system according to claim 1, wherein
when switching the synchronization control, the management server extracts a transaction log corresponding to the record not included in an entry of the table at a point of time of starting extraction of the non-synchronized file out of the transaction logs executed before the point of time of starting extraction of the non-synchronized files of extracting records where the synchronization flag in the table is set to non-synchronized as a difference log after the point of time of starting extraction of the non-synchronized file, and transmitting the difference log and the non-synchronized file to the database of the synchronization destination.

3. The database management system according to claim 1, wherein
the management server determines an isolation property of a transaction from other transactions having an overlapped execution period with said transaction based on a query log of the transaction during synchronization control based on the query transmission method, and when it is determined that isolation is possible, transmits the query log to the database of the synchronization destination.

4. The database management system according to claim 1, wherein
the management server determines an isolation property of a transaction from other transactions having an overlapped execution period with said transaction based on a transaction log of the transaction during synchronization control based on the query transmission method, and when it is determined that isolation is possible, transmits the query log corresponding to the transaction log to the database of the synchronization destination.

5. The database management system according to claim 1, wherein
the management server calculates a remaining synchronization time of a case where synchronization is continued based on the table method by performing a simulation calculation of a time required for updating all entries in the table from non-synchronized to synchronized, based on an update frequency of each record stored in the table.

6. The database management system according to claim 1, wherein
the management server calculates a remaining synchronization time of a case where the system is switched to the query transmission method by adding a transmission time of a record indicating non-synchronized and a synchronization time based on the query transmission method accompanying a number of non-synchronized transactions during the transmission time.

7. A method for controlling synchronization between databases, comprising:
a table for storing entries at least including an identifier for identifying a record of a database of a synchronization source, and a synchronization flag indicating whether the record is non-synchronized or synchronized between the database of the synchronization source and a database of a synchronization destination;
wherein following steps (1) and (2) are executed based on a table method, which performs data synchronization between databases by transmitting the record where the synchronization flag is set to non-synchronized to the database of the synchronization destination using the table and a query transmission method, which performs data synchronization between databases by transmitting an update log of the database of the synchronization source to the database of the synchronization destination;
(1) a step of periodically respectively calculating a remaining synchronization time when synchronization is continued using the table method and a remaining synchronization time by switching to the query transmission method, based on the non-synchronized and synchronized statuses indicated by the synchronization flag in the table; and
(2) a step of switching synchronization control when it is determined based on the result of the calculation that the remaining synchronization time is shorter when switched to the query transmission method.

8. The method for controlling synchronization between databases according to claim 7, wherein
said step (2) includes:
a step of extracting a transaction log as a difference log after a point of time of starting extraction of a non-synchronized file, the difference log being the transaction log corresponding to the record not included in an entry of the table at the point of time of starting extraction of the non-synchronized file out of the transaction logs executed before the point of time of starting extraction of the non-synchronized files, and the point of time of starting extraction of the non-synchronized files being the point of time when the records where a synchronization flag in the table is set to non-synchronized are extracted as the non-synchronized files; and
a step of transmitting the difference log and the non-synchronized file to the database of the synchronization destination.

9. The method for controlling synchronization between databases according to claim 7, further comprising:
during synchronization control based on the query transmission method,
a step of determining an isolation property of a transaction from other transactions having an overlapped execution period with said transaction based on a query log of the transaction; and
a step of transmitting the query log to the database of the synchronization destination when it is determined that isolation is possible.

10. The method for controlling synchronization between databases according to claim 7, wherein
during synchronization control based on the query transmission method,
a step of determining an isolation property of a transaction from other transactions having an overlapped execution period with said transaction based on a transaction log of said transaction; and
a step of transmitting a query log corresponding to said transaction log to the database of the synchronization destination when it is determined that isolation is possible.

11. The method for controlling synchronization between databases according to claim 7, wherein
a step of periodically calculating a remaining synchronization time of a case where synchronization is continued based on the table method in said step (1) performs calculation by simulating a time required for updating all entries in the table from non-synchronized to synchronized, based on an update frequency of each record stored in the table.

12. The method for controlling synchronization between databases according to claim 7, wherein
a step of periodically calculating a remaining synchronization time of a case where synchronization is switched to the query transmission method in step (1) performs calculation by adding a transmission time of a record indicating non-synchronized and a synchronization time based on the query transmission method accompanying a number of non-synchronized transactions during the transmission time.

\* \* \* \* \*